United States Patent
Anjo et al.

(10) Patent No.: US 10,997,567 B2
(45) Date of Patent: May 4, 2021

(54) WORK SUPPORT DEVICE, WORK SUPPORT METHOD AND COMPUTER READABLE STORAGE MEDIUM

(71) Applicant: CASIO COMPUTER CO., LTD., Tokyo (JP)

(72) Inventors: Keita Anjo, Tokyo (JP); Koji Nishitani, Tokyo (JP); Noriyoshi Katsumura, Saitama (JP); Taro Ejiri, Tokyo (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 917 days.

(21) Appl. No.: 15/649,247

(22) Filed: Jul. 13, 2017

(65) Prior Publication Data

US 2018/0018639 A1    Jan. 18, 2018

(30) Foreign Application Priority Data

Jul. 14, 2016    (JP) .............................. JP2016-139062
Jan. 27, 2017    (JP) .............................. JP2017-013134

(51) Int. Cl.
*G06Q 10/10*    (2012.01)
*G06F 3/0482*    (2013.01)
(Continued)

(52) U.S. Cl.
CPC ....... *G06Q 10/1097* (2013.01); *G06F 3/0482* (2013.01); *G06F 3/04845* (2013.01); *G06Q 10/063114* (2013.01)

(58) Field of Classification Search
CPC ......... G06Q 10/1097; G06Q 10/06311; G06Q 10/063114
(Continued)

(56) References Cited

U.S. PATENT DOCUMENTS

2001/0018673 A1*  8/2001  Goldband ............... G06F 9/453
                                                                    705/7.31
2002/0140733 A1* 10/2002  Edlund ................ G06Q 10/109
                                                                    715/764
(Continued)

FOREIGN PATENT DOCUMENTS

JP    2005-242965 A    9/2005
JP    2008-197765 A    8/2008
(Continued)

OTHER PUBLICATIONS

JPO; Application No. 2017-013134; Notice of Reasons for Refusal dated Oct. 8, 2019.

*Primary Examiner* — Eric W Stamber
*Assistant Examiner* — George H Walker, III
(74) *Attorney, Agent, or Firm* — Fitch, Even, Tabin & Flannery LLP

(57) ABSTRACT

A work support device includes a first display control unit and a registration unit. The first display control unit performs control to display a label image having a message to a second user designated by a first user on a display screen relevant to the message. The registration unit takes the message as a task, and correlates and registers task information on the task with (i) display screen identification information to identify the display screen on which the label image is displayed and (ii) user identification information to identify the second user.

8 Claims, 13 Drawing Sheets

(51) Int. Cl.
*G06Q 10/06* (2012.01)
*G06F 3/0484* (2013.01)

(58) Field of Classification Search
USPC .......................................................... 705/7.15
See application file for complete search history.

(56) References Cited

U.S. PATENT DOCUMENTS

| | | | |
|---|---|---|---|
| 2005/0086230 A1* | 4/2005 | Frees | G06Q 10/10 |
| 2008/0045286 A1* | 2/2008 | Setty | G09B 5/00 |
| | | | 463/9 |
| 2008/0270546 A1* | 10/2008 | Morris | G06Q 10/10 |
| | | | 709/206 |
| 2009/0234616 A1* | 9/2009 | Perkins | G06Q 10/06 |
| | | | 702/184 |
| 2009/0327023 A1* | 12/2009 | Nanji | G06Q 10/06395 |
| | | | 705/7.41 |
| 2010/0017223 A1* | 1/2010 | Johnson | G06Q 50/22 |
| | | | 705/2 |
| 2013/0135671 A1* | 5/2013 | Konuma | G06F 3/1274 |
| | | | 358/1.15 |
| 2014/0297584 A1* | 10/2014 | Jenkins | G06F 16/254 |
| | | | 707/602 |
| 2015/0154530 A1* | 6/2015 | Felix | G06Q 10/063114 |
| | | | 705/7.15 |
| 2016/0277330 A1* | 9/2016 | Jawaharlal | H04L 51/18 |
| 2017/0187758 A1* | 6/2017 | Denker | G06Q 30/06 |
| 2018/0077542 A1* | 3/2018 | Xie | G06Q 10/10 |
| 2020/0122855 A1* | 4/2020 | Conaway | B64D 43/00 |

FOREIGN PATENT DOCUMENTS

| | | |
|---|---|---|
| JP | 2012-023534 A | 2/2012 |
| JP | 2015-087780 A | 5/2015 |

\* cited by examiner

FIG.3A

| INDIVIDUAL/BUSINESS | REGISTRANT | DEGREE OF IMPORTANCE | REGISTRATION DATE AND TIME | TARGET | DUE DATE | COMPLETION DATE | PERSON WHO DID | MESSAGE | LABEL COLOR | ASSOCIATION WITH TYPE OF BUSINESS | ATTACHMENT | URL | COORDINATES |
|---|---|---|---|---|---|---|---|---|---|---|---|---|---|
| INDIVIDUAL TO-DO | TARO TANAKA | 2 | 2016/2/5 16:35 | TARO TANAKA | 2016/2/6 | 2016/2/6 | TARO TANAKA | PREPARE FOR GYOZA | N/A | NONE | NONE | N/A | N/A |
| INDIVIDUAL TO-DO | TARO TANAKA | 2 | 2016/2/5 17:35 | CERTIFIED PUBLIC TAX ACCOUNTANT | 2016/2/12 | N/A | N/A | I'M NOT SURE ABOUT JOURNALIZATION OF THIS. | YELLOW | ACCOUNTING-JOURNAL | NONE | https://ww… | x:206 y:351 |
| INDIVIDUAL TO-DO | TARO TANAKA | 3 | 2016/2/5 18:35 | LABOR AND SOCIAL SECURITY ATTORNEY | 2016/2/12 | N/A | N/A | A NEW EMPLOYEE HAS BEEN JOINED. | BLUE | NONE | NONE | https://ww… | x:301 y:501 |
| INDIVIDUAL TO-DO | CERTIFIED PUBLIC TAX ACCOUNTANT | 3 | 2016/2/8 19:01 | TARO TANAKA | 2016/2/15 | N/A | N/A | IS THIS A TYPO? | ORANGE | ACCOUNTING-JOURNAL | NONE | https://ww… | x:401 y:600 |
| … | … | … | … | … | … | … | … | … | … | … | … | … | … |

FIG.3B

| INDIVIDUAL/BUSINESS | REGISTRANT | DEGREE OF IMPORTANCE | REGISTRATION DATE AND TIME | TARGET | DUE DATE | COMPLETION DATE | PERSON WHO DID | MESSAGE | LABEL COLOR | ASSOCIATION WITH TYPE OF BUSINESS | ATTACHMENT | URL | COORDINATES |
|---|---|---|---|---|---|---|---|---|---|---|---|---|---|
| INDIVIDUAL TO-DO | SABURO KIMURA | 2 | 2016/2/8 19:01 | TARO TANAKA | 2016/2/15 | N/A | N/A | IS THIS A TYPO? | ORANGE | ACCOUNTING-JOURNAL | NONE | https://ww… | x:401 y:600 |
| INDIVIDUAL TO-DO | TARO TANAKA | 2 | 2016/2/5 17:35 | SABURO KIMURA | 2016/2/12 | N/A | N/A | I'M NOT SURE ABOUT JOURNALIZATION OF THIS. | YELLOW | ACCOUNTING-JOURNAL | NONE | https://ww… | x:206 y:351 |
| … | … | … | … | … | … | … | … | … | … | … | … | … | … |

| | |
|---|---|
| F — TO-DO REGISTRATION | ☒ — B4 |

F1 — CONTENT ⟨MANDATORY⟩
UP TO 100 EM-WIDTH/HALF-WIDTH CHARACTERS

F2 — DUE DATE
NO DUE DATE ▼

F3 — DEGREE OF IMPORTANCE
★☆☆  MODERATE ▼

F4 — COLOR
YELLOW ▼

F5 — OPEN TO-DO TO
● CERTIFIED PUBLIC TAX ACCOUNTANT   ○ LABOR AND SOCIAL SECURITY ATTORNEY   ○ STORE MANAGER

F6 — ATTACHED IMAGE
FILE NAME ▼

| | |
|---|---|
| F — TO-DO REGISTRATION | ☒ — B4 |

F1 — CONTENT ⟨MANDATORY⟩
I'M NOT SURE ABOUT JOURNALIZATION OF THIS. COULD YOU CHECK IF IT IS CORRECT?

F2 — DUE DATE
FEBRUARY 12 (SUN) ▼

F3 — DEGREE OF IMPORTANCE
★★☆  IMPORTANT ▼

F4 — COLOR
YELLOW ▼

F5 — OPEN TO-DO TO
● CERTIFIED PUBLIC TAX ACCOUNTANT   ○ LABOR AND SOCIAL SECURITY ATTORNEY   ○ STORE MANAGER

F6 — ATTACHED IMAGE
FILE NAME ▼

205 — Ia TO-DO, Ib ACCOUNTING, Ic SALARY, Id POP, Ie SALES TALLYING MANAGEMENT, B1 LABEL ATTACHING

** STORE

TRANSACTION | LEDGER & SUBSIDIARY BOOK | ACCOUNT SETTLEMENT

JOURNAL — REGISTERED TRANSACTION DETAILS CAN BE REFERRED TO IN ORDER OF DATE.

JOURNAL DETAILS

| SLIP DATE | MARCH 23, 2016 | MANAGEMENT NUMBER | | SLIP ABSTRACT | | | |
|---|---|---|---|---|---|---|---|
| DEBIT TOTAL AMOUNT (YEN) | | | 133 | CREDIT TOTAL AMOUNT (YEN) | 1,800 | CREDIT TOTAL CONSUMPTION TAX AMOUNT (YEN) | 0 |

DEAR MR. KIMURA
I'M NOT SURE ABOUT JOURNALIZATION OF THIS, COULD YOU CHECK IF IT IS CORRECT?  — H1a

001

| DEBIT ACCOUNT TITLE | SUPPLIES EXPENSE | CREDIT ACCOUNT TITLE | CASH |
|---|---|---|---|
| DEBIT SUBTITLE | | CREDIT SUBTITLE | |
| DEBIT CLIENT NAME | ** STORM | CREDIT CLIENT NAME | ** STORE |
| DEBIT CATEGORY | | CREDIT CATEGORY | |
| DEBIT ABSTRACT | PACKING TAPE | CREDIT ABSTRACT | |
| DEBIT TAX CLASS | TAXABLE | CREDIT TAX CLASS | UNTAXABLE |

| DEBIT AMOUNT (YEN) | 600 | DEBIT CONSUMPTION TAX AMOUNT (YEN) | 44 | CREDIT AMOUNT (YEN) | 1,800 | CREDIT CONSUMPTION TAX AMOUNT (YEN) | 0 |
|---|---|---|---|---|---|---|---|

IS CHECKING DONE?

B5 — OK    CANCEL — B6

FIG.12

| | | Ia | Ib | Ic | Id | Ie | B1 |
|---|---|---|---|---|---|---|---|
| 205 | | ☑ TO-DO | ACCOUNTING | 💴 SALARY | 📄 POP | SALES TALLYING MANAGEMENT | LABEL ATTACHING |

** STORE

| TRANSACTION | LEDGER & SUBSIDIARY BOOK | ACCOUNT SETTLEMENT |
|---|---|---|

JOURNAL — REGISTERED TRANSACTION DETAILS CAN BE REFERRED TO IN ORDER OF DATE. ☒

JOURNAL DETAILS

| SLIP DATE | MARCH 23, 2016 | MANAGEMENT NUMBER | | SLIP ABSTRACT | | | |
|---|---|---|---|---|---|---|---|
| DEBIT TOTAL AMOUNT (YEN) | DEAR MR. KIMURA I'M NOT SURE ABOUT JOURNALIZATION OF THIS. COULD YOU CHECK IF IT IS CORRECT? | | 133 | CREDIT TOTAL AMOUNT (YEN) | 1,800 | CREDIT TOTAL CONSUMPTION TAX AMOUNT (YEN) | 0 |

001 — H1b

| DEBIT ACCOUNT TITLE | SUPPLIES EXPENSE | CREDIT ACCOUNT TITLE | CASH |
|---|---|---|---|
| DEBIT SUBTITLE | | CREDIT SUBTITLE | |
| DEBIT CLIENT NAME | ** STORM | CREDIT CLIENT NAME | ** STORE |
| DEBIT CATEGORY | | CREDIT CATEGORY | |
| DEBIT ABSTRACT | PACKING TAPE | CREDIT ABSTRACT | |
| DEBIT TAX CLASS | TAXABLE | CREDIT TAX CLASS | UNTAXABLE |
| DEBIT AMOUNT (YEN) | 600 | DEBIT CONSUMPTION TAX AMOUNT (YEN) | 44 | CREDIT AMOUNT (YEN) | 1,800 | CREDIT CONSUMPTION TAX AMOUNT (YEN) | 0 |

** STORE | TO-DO | ACCOUNTING | SALARY | POP | SALES TALLYING MANAGEMENT | LABEL ATTACHING

TRANSACTION | LEDGER & SUBSIDIARY BOOK | ACCOUNT SETTLEMENT

JOURNAL  REGISTERED TRANSACTION DETAILS CAN BE REFERRED TO IN ORDER OF DATE.   ☒

JOURNAL DETAILS

| SLIP DATE | MARCH 23, 2016 | MANAGEMENT NUMBER | | SLIP ABSTRACT | | |
|---|---|---|---|---|---|---|
| DEBIT TOTAL AMOUNT (YEN) | DEAR MR. KIMURA I'M NOT SURE ABOUT JOURNALIZATION OF THIS. COULD YOU CHECK IF IT IS CORRECT? | | 133 | CREDIT TOTAL AMOUNT (YEN) | 1,800 | CREDIT TOTAL CONSUMPTION TAX AMOUNT (YEN) | 0 |

001    —H1b    /H2

| DEBIT ACCOUNT TITLE | SUPPLIES EXPENSE | CREDIT ACCOUNT TITLE | CASH |
|---|---|---|---|
| DEBIT SUBTITLE | | CREDIT | |
| DEBIT CLIENT NAME | ** STORM | DEAR MR. TANAKA IS THIS A TYPO? STORM → STORE | ** STORE |
| DEBIT CATEGORY | | | |
| DEBIT ABSTRACT | PACKING TAPE | CREDIT ABSTRACT | |
| DEBIT TAX CLASS | TAXABLE | CREDIT TAX CLASS | UNTAXABLE |
| DEBIT AMOUNT (YEN) | 600 | DEBIT CONSUMPTION TAX AMOUNT (YEN) | 44 | CREDIT AMOUNT (YEN) | 1,800 | CREDIT CONSUMPTION TAX AMOUNT (YEN) | 0 |

R1  WRITE RESPONSE

B7  CHECK AND RESPOND    CANCEL  B8

FIG.15

| | | | | | | |
|---|---|---|---|---|---|---|
| 205 | Ia | Ib | Ic | Id | Ie | B1 |

** STORE — TO-DO | ACCOUNTING | SALARY | POP | SALES TALLYING MANAGEMENT | LABEL ATTACHING

| TRANSACTION | LEDGER & SUBSIDIARY BOOK | ACCOUNT SETTLEMENT |
|---|---|---|

JOURNAL — REGISTERED TRANSACTION DETAILS CAN BE REFERRED TO IN ORDER OF DATE.

JOURNAL DETAILS      H1b      H3

| SLIP DATE | MARCH 23, 2016 | MANAGEMENT NUMBER | | SLIP ABSTRACT | |
|---|---|---|---|---|---|
| DEBIT TOTAL AMOUNT (YEN) | *DEAR MR. KIMURA I'M NOT SURE ABOUT JOURNALIZATION OF THIS. COULD YOU CHECK IF IT IS CORRECT?* | | DEAR MR. TANAKA THERE IS NO PARTICULAR PROBLEM IN THE ACCOUNT TITLE. | | CREDIT TOTAL CONSUMPTION TAX AMOUNT (YEN) — 0 |

001

| DEBIT ACCOUNT TITLE | SUPPLIES EXPENSE | | CREDIT ACCOUNT TITLE | CASH | |
|---|---|---|---|---|---|
| DEBIT SUBTITLE | | | CREDIT SUBTITLE | | |
| DEBIT CLIENT NAME | ** STORM | | CREDIT CLIENT NAME | ** STORE | |
| DEBIT CATEGORY | | | CREDIT CATEGORY | | |
| DEBIT ABSTRACT | PACKING TAPE | | CREDIT ABSTRACT | | |
| DEBIT TAX CLASS | TAXABLE | | CREDIT TAX CLASS | UNTAXABLE | |
| DEBIT AMOUNT (YEN) | 600 | DEBIT CONSUMPTION TAX AMOUNT (YEN) 44 | CREDIT AMOUNT (YEN) 1,800 | CREDIT CONSUMPTION TAX AMOUNT (YEN) | 0 | though it is not limited to this. The server 1 may be any type of computer, such as a PC (Personal Computer), or a microcomputer.

WORK SUPPORT DEVICE, WORK SUPPORT METHOD AND COMPUTER READABLE STORAGE MEDIUM

CROSS-REFERENCE TO RELATED APPLICATIONS

This application is based upon and claims the benefit of priority from the prior Japanese Patent Application No. 2016-139062, filed on Jul. 14, 2016 and the prior Japanese Patent Application No. 2017-013134, filed on Jan. 27, 2017, the entire contents of which are incorporated herein by reference.

BACKGROUND OF THE INVENTION

1. Field of the Invention

The present invention relates to a work support device, a work support method and a computer readable storage medium.

2. Description of the Related Art

There has been known, for example, a method of, on a web page(s) where comments in the form of labels can be attached, a web surfer(s) attaching comments to an arbitrary position on the web page, and other web surfer(s) reading the comments, so that all the web surfers who visit the web page can exchange information with one another. (Refer to Japanese Patent Application Publication No. 2005-242965.)

SUMMARY OF THE INVENTION

According to a first aspect of the present invention, there is provided a work support device including: a first display control unit that performs control to display a label image having a message to a second user designated by a first user on a display screen relevant to the message; and a registration unit that takes the message as a task, and correlates and registers task information on the task with (i) display screen identification information to identify the display screen on which the label image is displayed and (ii) user identification information to identify the second user.

According to a second aspect of the present invention, there is provided a work support method including: a first display control step of performing control to display a label image having a message to a second user designated by a first user on a display screen relevant to the message; and a registration step of taking the message as a task, and correlating and registering task information on the task with (i) display screen identification information to identify the display screen on which the label image is displayed and (ii) user identification information to identify the second user.

According to a third aspect of the present invention, there is provided a non-transitory computer readable storage medium storing a program for a computer of a work support device to perform a procedure including: a first display control process that performs control to display a label image having a message to a second user designated by a first user on a display screen relevant to the message; and a registration process that takes the message as a task, and correlates and registers task information on the task with (i) display screen identification information to identify the display screen on which the label image is displayed and (ii) user identification information to identify the second user.

BRIEF DESCRIPTION OF THE DRAWINGS

The present invention is fully understood from the detailed description given hereinafter and the accompanying drawings, which are given byway of illustration only and thus are not intended to limit the present invention, wherein:

FIG. 3A is a task data table for a user, Mr. Taro TANAKA;

FIG. 3B is a task data table for another user, Mr. Saburo KIMURA;

FIG. 6 shows an example of a predetermined process screen of an accounting application;

FIG. 9A shows an example of a display screen where a registration form for a label-format To-Do task is displayed, wherein in the registration form, data are not input yet;

FIG. 9B shows an example of the display screen where the registration form for a label-format To-Do task is displayed, wherein in the registration form, data are already input;

FIG. 10 shows an example of a display screen of a terminal device displayed when the label attaching process has been performed;

FIG. 11 shows an example of a display screen where a check form is displayed;

FIG. 12 shows an example of a display screen of a terminal device displayed when the label checking process has been performed;

FIG. 13 shows an example of the display screen of the terminal device displayed when the label attaching process has been performed;

FIG. 14 shows an example of a display screen where a response form is displayed; and FIG. 15 shows another example of the display screen of the terminal device displayed when the label checking process has been performed.

DETAILED DESCRIPTION OF THE PREFERRED EMBODIMENTS

Hereinafter, embodiments of the present invention are described in detail with reference to the drawings. However, the present invention is not limited to the illustrated embodiments.

The schematic configuration of a work support system 100 is described with reference to FIG. 1.

Figure 1:
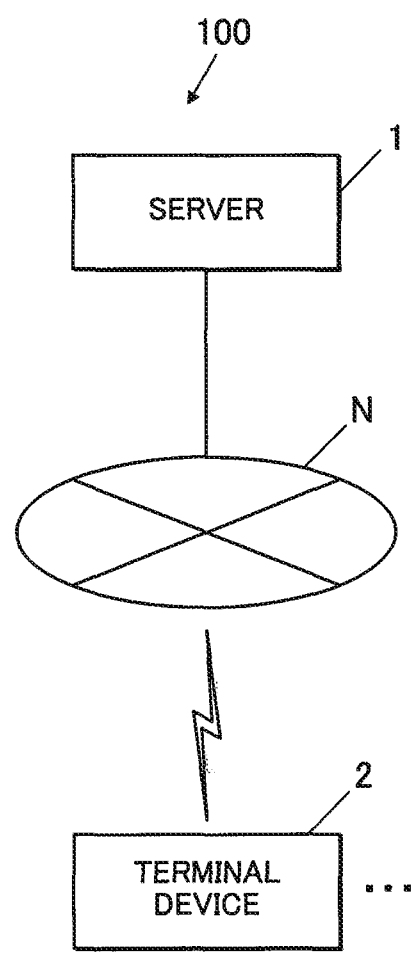
FIG. 1 is a block diagram showing a work support system according to embodiments of the present invention.

FIG. 1 schematically shows the configuration of the work support system 100.

As shown in FIG. 1, the work support system 100 according to embodiments of the present invention includes a server 1 as a work support device and terminal devices 2. The server 1 and the terminal devices 2 are connected to one another via a communication network N so as to communicate information.

The server 1 is, for example, a server on cloud.

The server 1 manages work items (tasks) to be done by users of the terminal devices 2 and also performs business processes associated with the work items.

Each terminal device 2 is a terminal device possessed by a user who is a sole proprietor, such as an owner of a private enterprise, an owner of a small to medium-sized enterprise or a store owner of a privately-run store, or by a user who is a specialist, such as a certified public tax accountant, a labor and social security attorney or a consultant. Examples of the terminal device 2 include a smartphone, a tablet PC (Personal Computer), a mobile phone, a PDA (Personal Digital Assistant), a laptop PC and a desktop PC.

Using a web browser(s) or the like, the terminal device 2 accepts inputs by user operations and sends the same to the server 1, and displays information sent and received from the server 1.

The communication network N is, for example, Internet, but may be another network, such as a LAN (Local Area Network).

In this embodiment, the work support system 100 has two or more terminal devices 2 with respect to the server 1. However, the present invention is not limited thereto. For example, it is possible that the work support system 100 has one terminal device 2 connected to the server 1, and the server 1 manages this terminal device 2. Further, the number of servers 1 is not limited to one, and may be two or more.

The functional configuration of the server 1 is described with reference to FIG. 2.

Figure 2:
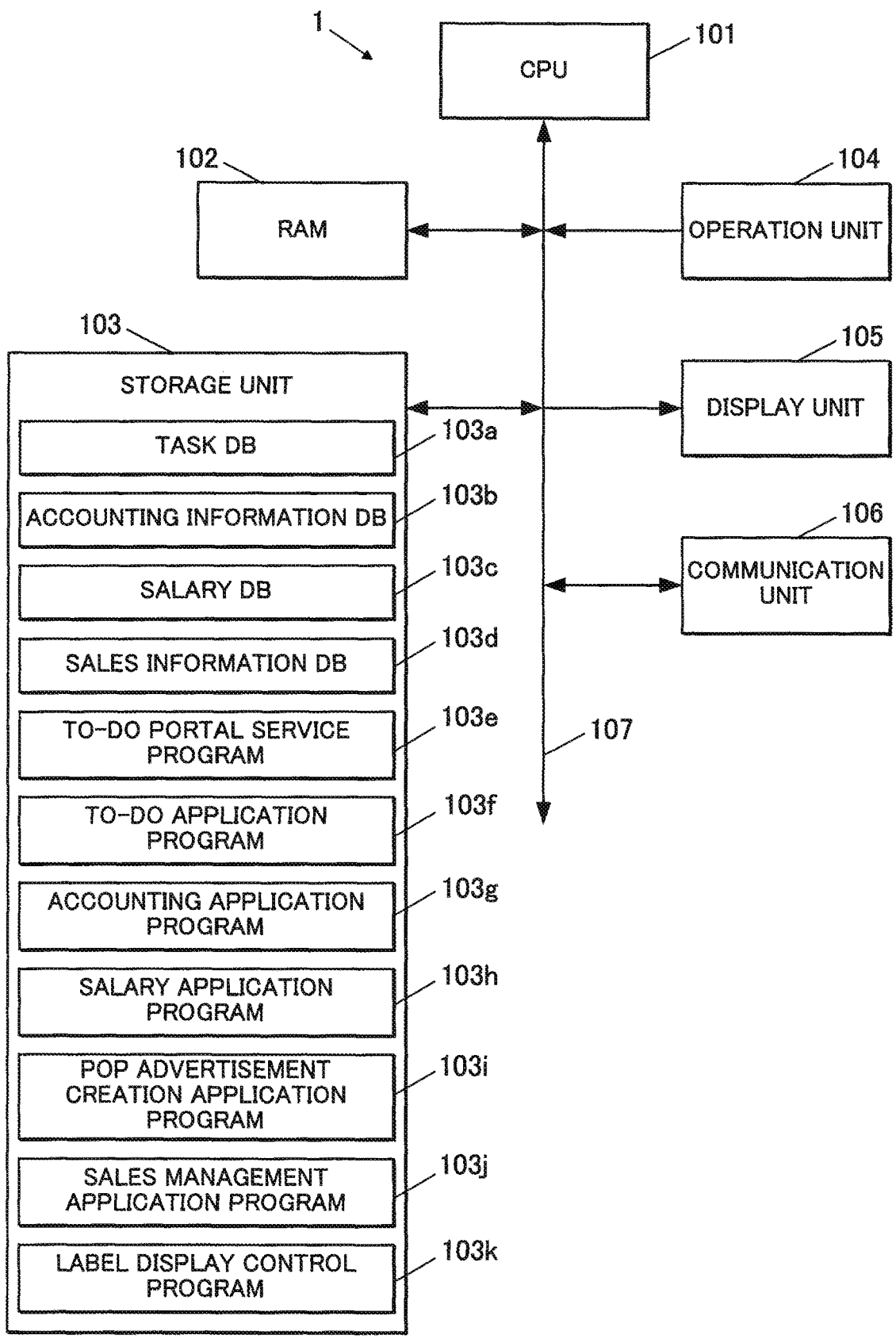
FIG. 2 is a block diagram showing the functional configuration of a server.

FIG. 2 is a block diagram showing the functional configuration of the server 1 of the work support system 100.

As shown in FIG. 2, the server 1 includes a CPU 101, a RAM 102, a storage unit 103, an operation unit 104, a display unit 105 and a communication unit 106. These units or the like of the server 1 are connected with one another via a bus 107.

The CPU (Central Processing Unit) 101 controls the units or the like of the server 1. The CPU 101 reads programs specified from among a system program and application programs stored in the storage unit 103, opens the read programs on a work area of the RAM 102, and performs various processes in accordance with the opened programs.

The RAM (Random Access Memory) 102 is, for example, a volatile memory, and has the work area where various programs or data read by the CPU 101 are temporarily stored.

The storage unit 103 is a storage unit which is constituted of, for example, an HDD (Hard Disk Drive), an SSD (Solid State Drive) or the like and in and from which data and programs can be written and read. The storage unit 103 stores therein a task DB 103a, an accounting information DB 103b, a salary DB 103c, a sales information DB 103d, a To-Do portal service program 103e, a To-Do application program 103f, an accounting application program 103g, a salary application program 103h, a POP advertisement creation application program 103i, a sales management application program 103j and a label display control program 103k.

The task DB 103a includes task data tables for respective users. In each task data table, To-Do tasks are stored. Here, the "To-Do task" is a work which a user should do.

For example, FIG. 3A shows an example of a task data table for a user who is an owner of a privately-run store (e.g. Taro TANAKA), and FIG. 3B shows an example of a task data table for a user who is a specialist (e.g. Saburo KIMURA, a certified public tax accountant).

As shown in FIG. 3A and FIG. 3B, in each task data table, for each work item to do, "Individual/Business" indicating whether the work item is an individual To-Do task or a business To-Do task, "Registrant" indicating the registrant of the work item, "Degree of Impotence" indicating the degree of importance of the work item, "Registration Date and Time" indicating the registration date and time of the work item, "Target" indicating the target of the work item (i.e. the person who should do the work item), "Due Date" indicating the due date for the work item, "Completion Date" indicating the completion date of the work item, "Person Who Did" indicating the person who did the work item, "Message" indicating the content of the work item, "Label Color" indicating the color of a label image (described below) showing the content of the work item, "Association with Type of Business" indicating whether the work item is associated with (or relevant to) any type of business, "Attachment" indicating whether image data of an image to be laid and displayed on the label image is present, "URL" indicating the display destination of the label image and "Coordinates" indicating the display position of the label image are correlated and stored.

The accounting information DB 103b stores therein accounting information that is used when accounting management business is performed.

The salary DB 103c stores therein salary information that is used when salary management business is performed.

The sales information DB 103d stores therein sales information that is used when sales management business is performed.

The To-Do portal service program 103e is a program to realize a To-Do portal service through which integrated management of To-Do tasks and starting of the application programs (the To-Do application program 103f, the accounting application program 103g, the salary application program 103h, the POP advertisement creation application program 103i, the sales management application program 103j and the label display control program 103k) relevant to (or associated with) To-Do tasks are performed.

The To-Do application program 103f is a program for each user to register To-Do tasks in the task DB 103a.

The accounting application program 103g is a program to perform a tax payment process of property tax, individual enterprise tax and so forth based on the accounting information stored in the accounting information DB 103b.

The salary application program 103h is a program to perform a salary calculation process for employees based on the salary information stored in the salary DB 103c.

The POP advertisement creation application program 103i is a program to create POP (point-of-purchase) advertisements as advertising media for sales promotion used at a store or the like.

The sales management application program 103j is a program to tally and analyze the sales of a store or the like daily and monthly based on the sales information stored in the sales information DB 103d.

The label display control program 103k is a program to realize a function of performing control to display a label image(s) having a message (the content of a To-Do task) on a display screen (on a display unit 205 of the terminal device 2) relevant to this message. The message is a matter to be conveyed to a user (a second user) (e.g. Saburo KIMURA) designated by another user (a first user) (e.g. Taro TANAKA).

Example of a To-Do portal service screen are described with reference to FIG. 5A and FIG. 5B.

Figure 5:
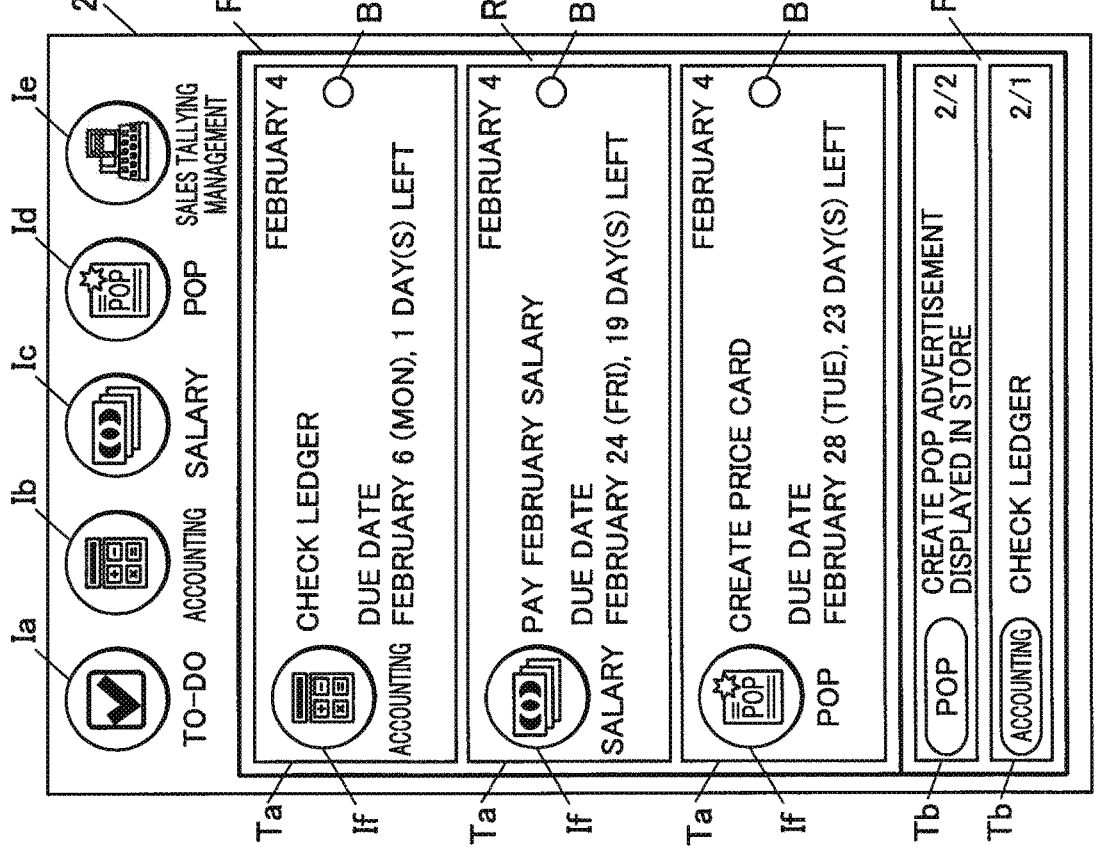
FIG. 5A shows an example of a To-Do portal service screen.
FIG. 5B shows an example of the To-Do portal service screen with a new label-format To-Do task registered.

FIG. 5A and FIG. 5B each show the To-Do portal service screen displayed, with a web browser of the terminal device 2, on the screen of the display unit 205.

As shown in FIG. 5A and FIG. 5B, at the upper part of the To-Do portal service screen, there is displayed a menu bar where icons to start the above-described To-Do application program 103f, accounting application program 103g, salary application program 103h, POP advertisement creation application program 103i and sales management application program 103j are arranged. More specifically, in the menu bar, there are displayed an icon Ia to start the To-Do application program 103f, an icon Ib to start the accounting application program 103g, an icon Ic to start the salary application program 103h, an icon Id to start the POP advertisement creation application program 103i and an icon Ie to start the sales management application program 103j.

When a user clicks (click operation) or touches (touch operation) each icon on the menu bar, screen transition to a predetermined process screen of an application corresponding to the operated icon is performed.

Figure 6:
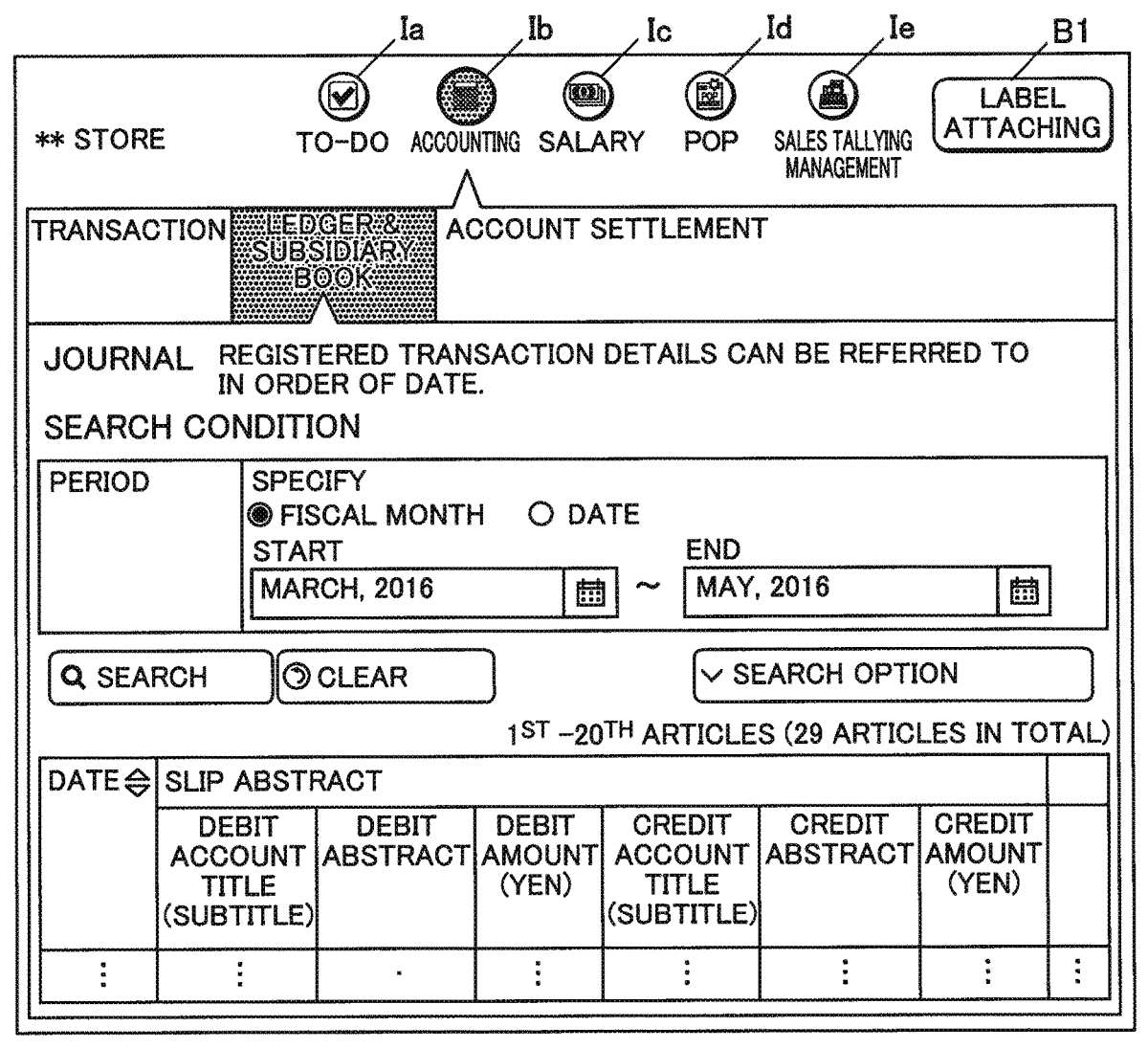

For example, when a user touches the icon Ib to start the accounting application program 103g, screen transition to a predetermined process screen (e.g. a journal screen) of the accounting application is performed as shown in FIG. 6. The menu bar is always displayed, no matter to which application's process screen, screen transition is performed. Further, in this embodiment, on any application's process screen, a label attaching button B1 is displayed in the menu bar. This label attaching button B1 is an icon to start the above-described label display control program 103k.

Under the menu bar on the To-Do portal service screen, a task index list display region R is displayed. In the task index list display region R, task indexes T showing summaries of To-Do tasks are displayed in the form of a list. In an upper region R1 of the task index list display region R, for example, task indexes (unattended task indexes) of unattended To-Do tasks, which are not done yet, are displayed in the form of a list by being arranged in ascending order of the due date, whereas in a lower region R2 of the task index list display region R, for example, task indexes (attended task indexes) of attended To-Do tasks, which are done, are displayed in the form of a list by being arranged in descending order of the completion date. The attended task indexes are automatically deleted when a predetermined period (e.g. one week) passes from their respective completion dates.

In the example of the display screen shown in FIG. 5A, unattended task indexes Ta having due dates of February 6 (Mon), February 24 (Fri) and February 28 (Tue) are displayed in the form of a list in the upper region R1. In each of these task indexes Ta, the content of a task to be done, an icon If for screen transition to a predetermined process screen of an application (a screen relevant to the content of the task to be done) and a task done button B2 to be selected and operated when the task is done are displayed. Further, two attended task indexes Tb are displayed in the lower region R2. In each of these task indexes Tb, the content of a task which is done and an abbreviation of an application (e.g. "Accounting", "Salary", "POP", etc.) through which the task is done are displayed.

In the example of the display screen shown in FIG. 5B, a To-Do task in the form of a label (a label-format To-Do task) having a due date of February 12 (Sun) (see FIG. 9B) is newly registered by the below-described label attaching process (see FIG. 7), and a task index Ta of this label-format To-Do task is inserted between the task index Ta having a due date of February 6 (Mon) displayed on the top and the task index Ta having a due date of February 24 (Fri) displayed second from the top in the upper region R1. This example of the display screen shows the To-Do portal service screen displayed when a user who is the registrant of the above label-format To-Do task logs in. However, on the To-Do portal service screen displayed when a user (e.g. a certified public tax accountant) designated in "Open To-Do to" (i.e. a person to whom the To-Do task is opened, hereinafter may also be referred to as the "open range") in registration of the above label-format To-Do task logs in, the same task index Ta is inserted and displayed.

If the numbers of task indexes to be displayed in the upper region R1 and in the lower region R2 of the task index list display region R in the form of list (s) are more than the numbers of task indexes that can be displayed in the upper region R1 and in the lower region R2 of the task index list display region R, the list(s) of task indexes are scrolled, so that all the task indexes can be displayed. Further, in the task index list display region R, only unattended task indexes may be displayed, and attended task indexes may be deleted from (not displayed in) the list. In this case, a display button to display attended task indexes may be provided.

The operation unit 104 has, for example, a key input unit, such as a keyboard, and a pointing device, such as a mouse. The operation unit 104 accepts inputs through keys of the key input unit and position inputs through the pointing device and outputs the operation information to the CPU 101.

The display unit 105 is, for example, constituted of an LCD (Liquid Crystal Display), an organic EL (Electro-Luminescence) display or the like. The display unit 105 displays thereon various screens according to commands of display signals output and input from the CPU 101.

The communication unit 106 is, for example, constituted of a network card or the like. The communication unit 106 is connected (communication connection) to the communication network N so as to communicate with devices (e.g. the terminal devices 2) on the communication network N.

The functional configuration of the terminal devices 2 is described with reference to FIG. 4.

Figure 4:
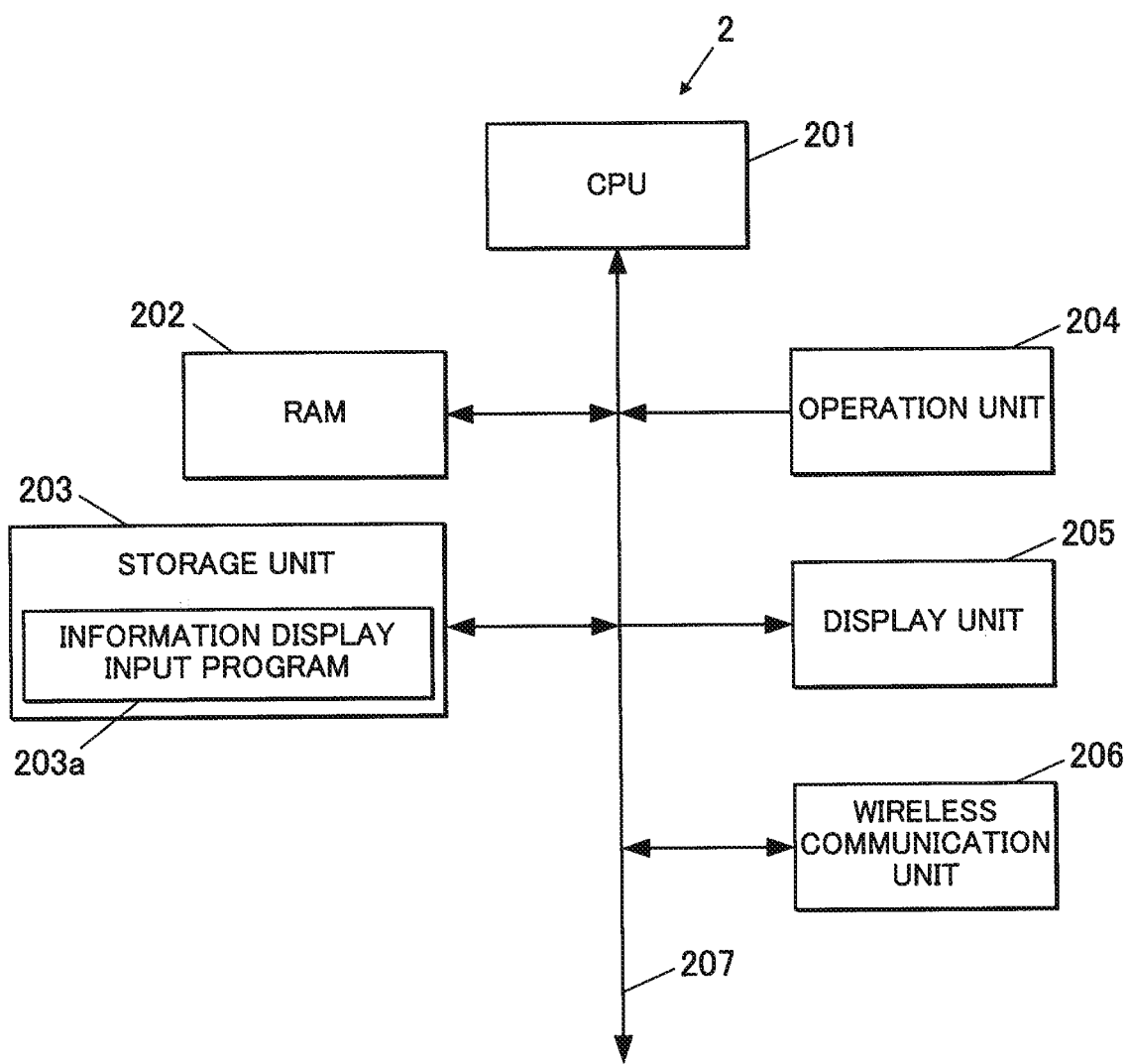
FIG. 4 is a block diagram showing the functional configuration of each terminal device.

FIG. 4 is a block diagram showing the functional configuration of each terminal device 2 of the work support system 100.

As shown in FIG. 4, each terminal device 2 includes a CPU 201, a RAM 202, a storage unit 203, an operation unit 204, a display unit 205 and a wireless communication unit 206. These units or the like of the terminal device 2 are connected with one another via a bus 207.

The CPU 201 controls the units or the like of the terminal device 2. The CPU 201 reads programs specified from among a system program and application programs stored in the storage unit 203, opens the read programs on a work area of the RAM 202, and performs various processes in accordance with the opened programs. The CPU 201 stores results of the processes in the RAM 202, and displays the results on the display unit 205 as needed.

The RAM 202 is, for example, a volatile memory, and has the work area where various programs or data read by the CPU 201 are temporarily stored.

The storage unit 203 is a storage unit which is constituted of, for example, a flash memory, an EEPROM (Electrically Erasable Programmable Read Only Memory) or the like and in and from which data and programs can be written and read. The storage unit 203 stores therein an information display input program 203a.

The information display input program 203a is, what is called, a web browser, and is a program to realize a function of accepting inputs by user operations and sending information based on the inputs to the server 1, and displaying information sent and received from the server 1 on the display unit 205.

The operation unit 204 is, for example, constituted of a touch panel, and accepts touch inputs from a user and outputs the operation information to the CPU 201.

The touch panel is integrated with the display unit 205, and detects, with its system, such as an electrostatic capacitance system, a resistive film system or an ultrasound surface acoustic wave system, XY coordinates of touch positions which a user touches on the display unit 205. The touch panel outputs position signals of the XY coordinates of the touch positions to the CPU 201.

The display unit 205 is, for example, constituted of an LCD, an organic EL display or the like. The display unit 205 displays thereon various screens according to commands of display signals output and input from the CPU 201.

The wireless communication unit 206 includes an antenna, a modulation-demodulation circuit and a signal processing circuit. The wireless communication unit 206 sends and receives, by radio waves, information to and from a base station(s), an access point(s) or the like connected to the communication network N so as to communicate with devices (e.g. the server 1) on the communication network N.

Label Attaching Process

Figure 7:
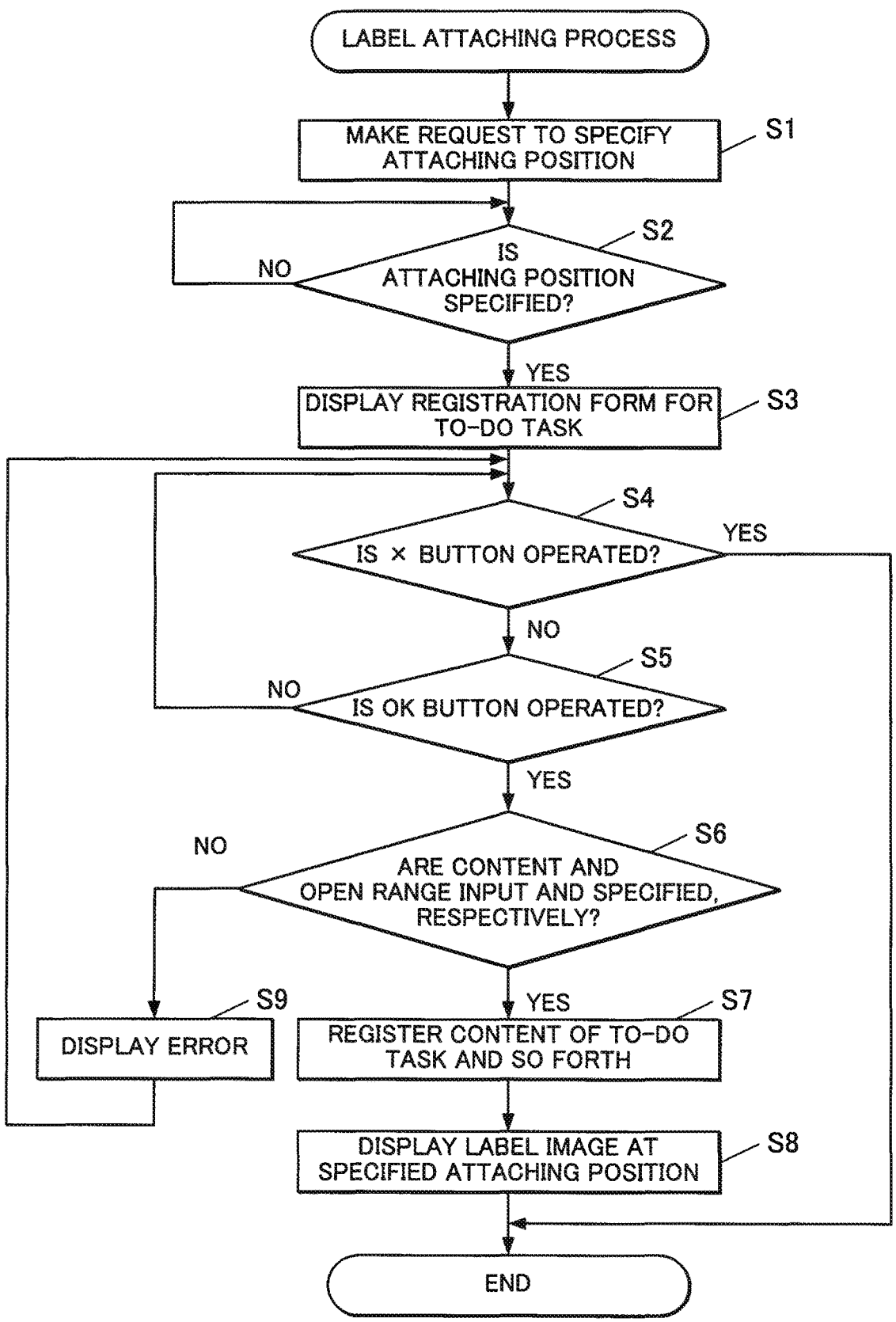
FIG. 7 is a flowchart of a label attaching process.

The label attaching process by the work support system 100 is described with reference to FIG. 7.

By taking input of an execution command for the label attaching process to the server 1 as a trigger, the CPU 101 reads the label display control program 103k from the storage unit 103 and opens the read program 103k in the RAM 102, thereby performing the label attaching process in cooperation with the label display control program 103k. The execution of the label attaching process is commanded by a user operating (e.g. touching) the label attaching button B1 (see FIG. 10) of the terminal device 2 and the CPU 101 of the server 1 receiving information thereon through the communication unit 106.

First, the CPU 101 makes a request to specify a label-image attaching position (Step S1). More specifically, the CPU 101 sends data of an indication to facilitate specifying the label-image attaching position to the terminal device 2 through the communication unit 106, and performs control to display the indication to facilitate specifying the label-image attaching position on the display unit 205 of the terminal device 2. For example, although in FIG. 10, a label image H1a is already displayed, for that, a user specifies the position to which the label image H1a is attached by touching the display screen in response to the indication to facilitate specifying the label-image attaching position.

Next, the CPU 101 determines whether the label-image attaching position is specified (Step S2). More specifically, the CPU 101 determines whether the label-image attaching position is specified by determining whether it receives coordinate information indicating the label-image attaching position through the communication unit 106.

When determining that the label-image attaching position is not specified (Step S2; NO), the CPU 101 repeats Step S2.

On the other hand, when determining that the label-image attaching position is specified (Step S2; YES), the CPU 101 sends data of a registration form for a label-format To-Do task to the terminal device 2 through the communication unit 106, and performs control to display the registration form F (see FIG. 9A) on the display unit 205 of the terminal device 2 (Step S3).

As shown in FIG. 9A, the registration form F has a content input portion F1, a due date input portion F2, a degree-of-importance input portion F3, a color input portion F4, an open range input portion F5, an attached image input portion F6, an OK button B3 and a x (cross) button B4.

The content input portion F1 is a portion where a message (the content of a To-Do task) to a target (a certified public tax accountant, a labor and social security attorney or a store manager) who can be designated in the "Open To-Do to" as a person to whom the message (i.e. the To-Do task) is opened is input as text information. The content input portion F1 is constituted of a text box. Input of a message to the content input portion F1 is mandatory. More specifically, for example, if the label image H1a shown in FIG. 10 is the desired label image to display, the text information of "I'm not sure about journalization of this. Could you check if it is correct?" is input to the content input portion F1 as shown in FIG. 9B.

The due date input portion F2 is a portion where a due date, namely, a due date to respond to the message, is selected and input from a pull-down menu. For example, if the desired due date is February 12 (Sun), the "February, 12 (Sun)" is selected and input to the due date input portion F2 as shown in FIG. 9B. Input of a due date to the due date input portion F2 is optional.

The degree-of-importance input portion F3 is a portion where the degree of importance of the message is selected and input from a pull-down menu. The pull-down menu of the degree-of-importance input portion F3 is constituted of "★ ☆☆ Moderate (degree of importance: 1)", "★ ★ ☆ Important (degree of importance: 2)" and "★★★ Most Important (degree of importance: 3)". For example, if the desired degree of importance is "Important", the "★ ★ ☆ Important (degree of importance: 2)" is selected and input to the degree-of-importance input portion F3.

The color input portion F4 is a portion where a display color of a label image is selected and input from a pull-down menu. The pull-down menu of the color input portion F4 is constituted of, for example, "Yellow", "Blue", "Orange" and so forth.

The open range input portion F5 is a portion where a person to whom the message is opened (i.e. the open range), namely, a target (a certified public tax accountant, a labor and social security attorney or a store manager) of the message, is designated. The open range input portion F5 is constituted of radio buttons. That is, only one of the "Certified Public Tax Accountant," "Labor and Social Security Attorney" and "Store Manager" is designated. Input of the open range to the open range input portion F5 is mandatory. For example, if the desired open range is the "Certified Public Tax Accountant", a radio button for the "Certified Public Tax Accountant" is pressed so that the "Certified Public Tax Accountant" can be input.

In the open range input portion F5, multiple targets may be designated. In this case, checkboxes or the like are used instead of the radio buttons.

The attached image input portion F6 is a portion where an image (e.g. a thumbnail image) to be laid and displayed on the label image is selected and input from a pull-down menu.

The OK button B3 is a button that is used to fix the information input to the registration form F.

The x button B4 is a button that is used to cancel the operations (or information) input to the registration form F.

Then, the CPU 101 determines whether the x button B4 is operated (Step S4). More specifically, the CPU 101 determines whether the x button B4 is operated by determining whether it receives information indicating that the x button B4 is operated through the communication unit 106.

When determining that the x button B4 is operated (Step S4; YES), the CPU 101 ends the label attaching process.

On the other hand, when determining that the x button B4 is not operated (Step S4; NO), the CPU 101 determines whether the OK button B3 is operated (Step S5). More specifically, the CPU 101 determines whether the OK button B3 is operated by determining whether it receives information indicating that the OK button B3 is operated through the communication unit 106.

When determining that the OK button B3 is not operated (Step S5; NO), the CPU 101 returns to Step S4.

On the other hand, when determining that the OK button B3 is operated (Step S5; YES), the CPU 101 determines whether a massage is input to the content input portion F1 and also the open range is input to (or specified in) the open range input portion F5, which are mandatory (Step S6). More specifically, the CPU 101 determines whether a massage is input to the content input portion F1 and also the open range is input to the open range input portion F5 by determining whether it receives information indicating that a massage is input to the content input portion F1 and also the open range is input to the open range input portion F5 through the communication unit 106.

When determining that a massage is input to the content input portion F1 and also the open range is input to the open range input portion F5 (Step S6; YES), the CPU 101 receives the information input to the registration form F through the communication unit 106, and registers the same in the task data tables (see FIG. 3A and FIG. 3B) for the user (e.g. Taro TANAKA) who is the registrant and the user (e.g. Saburo KIMURA) who is the target (Step S7).

Then, the CPU 101 sends data of a label image generated based on the information input to the registration form F to the terminal device 2 through the communication unit 106, and performs control to display the label image at the label-image attaching position specified in Step S1 (Step S8), and then ends the label attaching process.

On the other hand, when determining that no massage is input to the content input portion F1 and/or no open range is input to the open range input portion F5 (Step S6; NO), the CPU 101 sends data of an error indication indicating that no massage is input to the content input portion F1 and/or no open range is input to the open range input portion F5 to the terminal device 2, and performs control to display the error indication on the display unit 205 of the terminal device 2 (Step S9), and then returns to Step S4.

Label Checking Process

Figure 8:
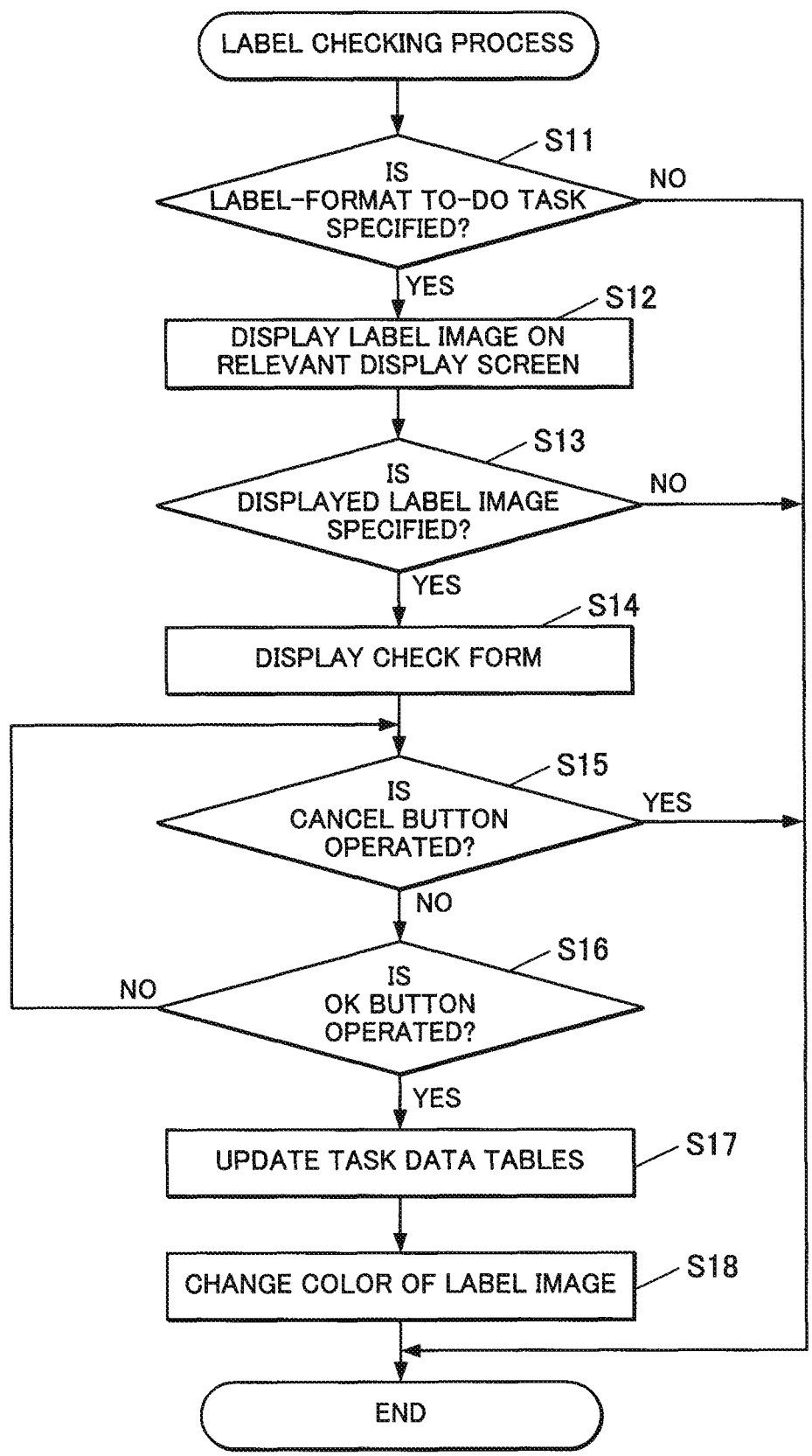
FIG. 8 is a flowchart of a label checking process.

The label checking process by the work support system 100 is described with reference to FIG. 8. The label checking process is a process for a target (e.g. a certified public tax accountant (Saburo KIMURA)) to check a label image (e.g. the label image H1*a* shown in FIG. 10) attached by the label attaching process.

By taking input of an execution command for the label checking process to the server 1 as a trigger, the CPU 101 reads the label display control program 103*k* from the storage unit 103 and opens the read program 103*k* in the RAM 102, thereby performing the label checking process in cooperation with the label display control program 103*k*. The execution of the label checking process is commanded by the To-Do portal service program 103*e* being started.

First, the CPU 101 determines whether a label-format To-Do task is specified (Step S11). More specifically, the CPU 101 determines whether a label-format To-Do task is specified by determining whether it receives information indicating that a label-format To-Do task is specified through the communication unit 106. For example, when the user operates (e.g. touches) an icon If displayed in an unattended task index T (Ta) on the To-Do portal service screen displayed on the display unit 205 of the terminal device 2 shown in FIG. 5A and FIG. 5B, the terminal device 2 sends information indicating that a label-format To-Do task is specified to the server 1 through the wireless communication unit 206.

Although not shown, there is also a task index(es) with no icon for screen transition to a screen relevant to the content of a task to be done (a To-Do task) displayed, the icon being, for example, the icon If for screen transition to a predetermined process screen of the accounting application. The To-Do task of this type of task index is a To-Do task to be done on the To-Do application when the To-Do application program 103*f* is started by the icon Ia being operated.

When determining that no label-format To-Do task is specified (Step S11; NO), the CPU 101 ends the label checking process.

On the other hand, when determining that a label-format To-Do task is specified (Step S11; YES), the CPU 101 obtains task information on the specified label-format To-Do task from the task data table (s) (see FIG. 3A and FIG. 3B), and sends data of a label image generated based on the task information to the terminal device 2 through the communication unit 106, and performs control to display the label image at the position of coordinates indicated by the coordinate information correlated with the task information (Step S12).

More specifically, for example, when the user operates (e.g. touches) an icon If displayed in an unattended task index T (Ta) on the To-Do portal service screen shown in FIG. 5A and FIG. 5B, the CPU 101 obtains task information on the specified task index T (Ta) from the task data table shown in FIG. 3B (the task data table for the certified public tax accountant (Saburo KIMURA)). Then, the CPU 101 sends data of a label image generated based on the task information to the terminal device 2 through the communication unit 106, and performs control to display, for example, the label image H1*a* at the position of coordinates (x:206, y:351) indicated by the coordinate information correlated with the task information, as shown in FIG. 10. Hence, the certified public tax accountant, Mr. Saburo KIMURA, can check the message of "I'm not sure about journalization of this. Could you check if it is correct?" of the label image H1*a* while looking at a journal detail screen to which the label image H1*a* is attached, and accordingly can readily understand the message.

Next, the CPU 101 determines whether the label image displayed in the terminal device 2 is specified (Step S13). More specifically, the CPU 101 determines whether the label image displayed in the terminal device 2 is specified by determining whether it receives information indicating that the displayed label image is specified through the communication unit 106. For example, when the user (Saburo KIMURA) operates (e.g. touches) the label image H1*a* displayed on the display unit 205 of the terminal device 2 as shown in FIG. 10, the terminal device 2 sends information indicating that the label image H1*a* is specified to the server 1 through the wireless communication unit 206.

When determining that the displayed label image is not specified (Step S13; NO), the CPU 101 ends the label checking process.

On the other hand, when determining that the displayed label image is specified (Step S13; YES), the CPU 101 sends, to the terminal device 2 through the communication unit 106, data of a check form to notify that checking of the displayed label image is done, and performs control to display the check form G (see FIG. 11) on the display unit 205 of the terminal device 2 (Step S14).

As shown in FIG. 11, on the check form G, the question of "Is checking done?" is written, and the check form G has an OK button B5 to respond to this question and a cancel button B6.

Then, the CPU 101 determines whether the cancel button B6 is operated (Step S15). More specifically, the CPU 101 determines whether the cancel button B6 is operated by determining whether it receives information indicating that the cancel button B6 is operated through the communication unit 106.

When determining that the cancel button B6 is operated (Step S15; YES), the CPU 101 ends the label checking process.

On the other hand, when determining that the cancel button B6 is not operated (Step S15; NO), the CPU 101 determines whether the OK button B5 is operated (Step S16). More specifically, the CPU 101 determines whether the OK button B5 is operated by determining whether it receives information indicating that the OK button B5 is operated through the communication unit 106.

When determining that the OK button B5 is not operated (Step S16; NO), the CPU 101 returns to Step S15 and then proceeds to the following step(s).

On the other hand, when determining that the OK button B5 is operated (Step S16; YES), the CPU 101 updates the task data tables for the relevant users (Step S17). More specifically, for example, when the user (Saburo KIMURA) touches the label image H1a shown in FIG. 10 and then operates the OK button B5 of the check form G, the CPU 101 registers the date of the operation on the OK button B5 in the section for the column "Completion Date" and registers the "Saburo KIMURA" in the section for the column "Person Who Did" of the corresponding work item (displayed second from the top) in the task data table for "Saburo KIMURA" (see FIG. 3B). The CPU 101 also registers the date of the operation on the OK button B5 in the section for the column "Completion Date" and registers the "Saburo KIMURA" in the section for the column "Person Who Did" of the corresponding work item (displayed second from the top) in the task data table for "Taro TANAKA" (see FIG. 3A).

Then, the CPU 101 performs control to change the color (display color) of the label image specified in Step S13 to a predetermined color (e.g. gray (see the label image H1b shown in FIG. 12, which is displayed by a dot pattern in FIG. 12)) indicating that checking is done (Step S18), and then ends the label checking process.

Note that when Mr. Saburo KIMURA, the certified public tax accountant, operates (e.g. touches) the label attaching button B1 on the display screen shown in FIG. 12, the label attaching process can be performed. Hence, for example, if Mr. Saburo KIMURA finds the typo of "**storm" in the section for the item "Debit Client Name" when checking the journal details shown in FIG. 12, he can attach and display a label image H2 having a target of Mr. Taro TANAKA and a message of "Is this a typo? storm→store" to and on the right side of the section for the item "Debit Client Name" as shown in FIG. 13. Thus, because the users, Mr. Taro TANAKA and Mr. Saburo KIMURA, can communicate with one another while looking at the shared (same) display screen (the journal detail screen), mutual understanding can be easier. Further, the users can communicate with one another on predetermined process screens of not only the accounting application but also the salary application, the POP advertisement creation application and the sales management application. Hence, these types of business can be appropriately performed.

As described above, according to this embodiment, the server 1 performs control to display the label image H1a having a message to a second user (e.g. Saburo KIMURA) designated by a first user (e.g. Taro TANAKA) on a display screen (the journal detail screen) relevant to the message, takes the message as a task, and correlates and registers task information on the task with (i) display screen identification information (URL) to identify the display screen (the journal detail screen) on which the label image H1a is displayed and (ii) user identification information to identify the second user (e.g. Saburo KIMURA) in the task data tables for the respective users.

Hence, the first user (e.g. Taro TANAKA) can easily exchange the task information with the second user (e.g. Saburo KIMURA) designated by the first user, namely, with a specific user, through the label image H1a. Further, because the message to the second user designated by the first user is registered in the task data table(s) as the task to be done by the second user, the second user can be readily aware of the message.

Further, when the task information on the label-format To-Do task (task index T (Ta)) is selected, the server 1 performs control to display the label image H1a on the display screen (the journal detail screen) identified based on the display screen identification information (URL) correlated with the task information. Hence, the second user can readily understand the message.

Further, the server 1 sets the display position of the label image H1a in response to a user operation. Hence, the label image H1a can be displayed at a user's desired position by his/her intuitive operation.

Further, the server 1 sets the due date for the label-format To-Do task in response to a user operation. Hence, the first user (e.g. Taro TANAKA) can get the second user (e.g. Saburo KIMURA) to do, by the first user's desired date, the task which the first user would like the second user to do. Thus, the first user (e.g. Taro TANAKA) and the second user (e.g. Saburo KIMURA) can communicate with one another with high efficiency.

Further, the server 1 sets the degree of importance of the label-format To-Do task in response to a user operation. Hence, for example, the first user can get the second user to do, among label-format To-Do tasks, the task having a high degree of importance prior to the other(s).

Further, the server 1 sets the color of the label image in response to a user operation. Hence, colors of label images can be different according to the messages, which can increase usability of label images.

In the above, as a computer readable storage medium that stores the programs of the present invention, the HDD or SSD of the storage unit 103 is used. However, the present invention is not limited thereto. As the computer readable storage medium, a portable storage medium, such as a flash memory or a CD-ROM, can also be used. Further, as a medium to provide data of the programs of the present invention via a communication line, a carrier wave can also be used.

The descriptions in the above embodiment are examples of the work support device and the programs of the present invention, and hence the present invention is not limited thereto.

For example, in the label image H1a in the above embodiment, the due date for the message and/or the degree of impotence of the message may be displayed.

Further, with respect to the label-format To-Do task for which the due date is set in the above embodiment, the label image may be displayed until the set due date and not be displayed once the due date is past.

Further, in the above embodiment, only one target is set for each label-format To-Do task. However, the present invention is not limited thereto, and two or more targets may be set for each label-format To-Do task.

Further, in the above embodiment, the storage unit 103 of the server 1 stores therein the task DB 103a, the accounting information DB 103b, the salary DB 103c, the sales information DB 103d, the To-Do portal service program 103e, the To-Do application program 103f, the accounting application program 103g, the salary application program 103h, the POP advertisement creation application program 103i, the sales management application program 103j and the label display control program 103k, the CPU 101 of the server 1 performs the business processes based on the programs, and users operate a web browser to access the server 1, and input, output and/or read data (or information). However, the present invention is not limited thereto. For example, it is possible that the above programs are applied to application software that can be used via the communication network N, users download this application software to their respective terminal devices 2, and the terminal devices 2 perform the business processes.

Further, in the above embodiment, when the user (Saburo KIMURA) as the target touches the label image H1a displayed on the display unit 205 of the terminal device 2 as shown in FIG. 10, the check form G is displayed on the display unit 205. However, the present invention is not limited thereto. For example, when the user as the target touches the label image H1a, a response form R may be displayed on the display unit 205 as shown in FIG. 14. The response form R is a form to generate the below-described response label image, and has a response input portion R1, a check-and-respond button B7 and a cancel button B8. For example, when the user (Saburo KIMURA) writes the content of "I checked it. There is no particular problem in the account title." and touches the check-and-respond button B7, a response label image H3 having this content is generated, and as shown in FIG. 15, the label image H1a is replaced by a label image H1b having a predetermined color which indicates that checking of the label image H1a is done. The response label image H3 and the label image H1b are displayed in the state of being linked with one another.

Needless to say, detailed configurations and detailed actions of the respective components of the work support system 100 of the above embodiment can also be appropriately modified without departing from the spirit of the present invention.

In the above, some embodiments of the present invention are described. However, the scope of the present invention is not limited thereto. The scope of the present invention includes the scope of claims below and the scope of their equivalents.

What is claimed is:

1. A work support device connectable with a plurality of terminal devices via a network, comprising:
    a memory; and
    a processor that performs a procedure including:
        a display control process of performing control to read task information registered in the memory and display, on a second terminal device of a second user, a To-Do screen where the task information to be done by the second user is displayed as a task index in a form of a list; and
        a registration control process of, in response to a message being input and the second user being designated by a first user through a first terminal device of the first user so that a label image is positioned and displayed on a process screen displayed on the first terminal device, performing control to correlate and register in the memory the message as the task information to be done by the second user with information indicating the process screen, wherein
    in response to the task information to be done by the second user being registered in the memory by the registration control process, the display control process reflects the task information on the To-Do screen as a new task index, and in response to the new task index being specified by the second user on the To-Do screen, the display control process switches a display screen of the second terminal device from the To-Do screen to the process screen on which the label image is positioned.

2. The work support device according to claim 1, wherein when registering the task information in the memory, the registration control process correlates and registers positional information of the label image to be displayed on the process screen, and
    the display control process displays the process screen on which the label image is displayed at a position based on the positional information.

3. The work support device according to claim 1, wherein the message includes due date information.

4. The work support device according to claim 1, wherein the message includes degree-of-importance information.

5. A non-transitory computer readable storage medium storing a program for a computer of a work support device connectable with a plurality of terminal devices via a network to perform a procedure comprising:
    a display control process of performing control to read task information registered in a memory and display, on a second terminal device of a second user, a To-Do screen where the task information to be done by the second user is displayed as a task index in a form of a list; and
    a registration control process of, in response to a message being input and the second user being designated by a first user through a first terminal device of the first user so that a label image is positioned and displayed on a process screen displayed on the first terminal device, performing control to correlate and register in the memory the message as the task information to be done by the second user with information indicating the process screen, wherein
    in response to the task information to be done by the second user being registered in the memory by the registration control process, the display control process reflects the task information on the To-Do screen as a new task index, and in response to the new task index being specified by the second user on the To-Do screen, the display control process switches a display screen of the second terminal device from the To-Do screen to the process screen on which the label image is positioned.

6. The non-transitory computer readable storage medium according to claim 5, wherein
    when registering the task information in the memory, the registration control process correlates and registers positional information of the label image to be displayed on the process screen, and the display control process displays the process screen on which the label image is displayed at a position based on the positional information.

7. The non-transitory computer readable storage medium according to claim 5, wherein the message includes due date information.

8. The non-transitory computer readable storage medium according to claim 5, wherein the message includes degree-of-importance information.

* * * * *